(12) United States Patent
Wong et al.

(10) Patent No.: US 9,542,457 B1
(45) Date of Patent: Jan. 10, 2017

(54) METHODS FOR DISPLAYING OBJECT HISTORY INFORMATION

(71) Applicant: Google Inc., Mountain View, CA (US)

(72) Inventors: Alexander Wong, Boulder, CO (US); Eric Benson Schoffler, Boulder, CO (US); George York, Lyons, CO (US); Joshua Hudgins, Lafayette, CO (US); Nicholas Mark Vasic Cooper, Annandale (AU)

(73) Assignee: GOOGLE INC., Mountain View, CA (US)

( * ) Notice: Subject to any disclaimer, the term of this patent is extended or adjusted under 35 U.S.C. 154(b) by 264 days.

(21) Appl. No.: 14/074,162

(22) Filed: Nov. 7, 2013

(51) Int. Cl.
*G06F 17/30* (2006.01)

(52) U.S. Cl.
CPC ............... *G06F 17/30554* (2013.01)

(58) Field of Classification Search
CPC .................................................. G06F 17/30554
See application file for complete search history.

(56) References Cited

U.S. PATENT DOCUMENTS

| | | | |
|---|---|---|---|
| 5,579,471 A | 11/1996 | Barber et al. | |
| 6,006,239 A | 12/1999 | Bhansali et al. | |
| 6,009,405 A | 12/1999 | Leymann et al. | |
| 6,119,165 A | 9/2000 | Li et al. | |
| 6,314,105 B1 | 11/2001 | Luong | |
| 6,449,688 B1 | 9/2002 | Peters et al. | |
| 6,590,568 B1 | 7/2003 | Astala et al. | |
| 6,614,804 B1 | 9/2003 | McFadden et al. | |
| 6,687,735 B1 | 2/2004 | Logston et al. | |
| 6,711,557 B1 | 3/2004 | Palaniappan | |
| 6,947,396 B1 | 9/2005 | Salmi | |
| 7,030,861 B1 | 4/2006 | Westerman et al. | |
| 7,113,917 B2 | 9/2006 | Jacobi et al. | |

(Continued)

FOREIGN PATENT DOCUMENTS

| | | |
|---|---|---|
| EP | 0371608 | 6/1990 |
| EP | 2187322 A1 | 5/2010 |

(Continued)

OTHER PUBLICATIONS

Automatic Album Maker Moment.me Arrives on Android, Adds a "Manual Mode" Mode to Boost Engagement, TechCrunch, Feb. 18, 2013, http://techcrunch.com/2013/02/18/automatic-album-maker-moment-me-arrives-on-android-adds-a-manual-mode-mode-to-boost-engagement/.

(Continued)

*Primary Examiner* — Kris Mackes
(74) *Attorney, Agent, or Firm* — Young Basile Hanlon & MacFarlane, P.C.

(57) ABSTRACT

A method includes receiving a search request including a search input; and identifying a history information item based on the search input. The history includes information describing a prior state of an object. The method also includes determining whether information describing a current state of the object corresponds to the search input. The method includes outputting a prior-state based search result item that identifies the object and includes information based on the history information item. If the information describing the current state of the object corresponds to the search input, the method includes outputting a current-state based search result item that includes a link for accessing the object.

18 Claims, 8 Drawing Sheets

(56) References Cited

U.S. PATENT DOCUMENTS

| | | | |
|---|---|---|---|
| 7,146,377 B2 | 12/2006 | Nowicki et al. | |
| 7,386,576 B2 | 6/2008 | Watanabe et al. | |
| 7,620,902 B2 | 11/2009 | Manion et al. | |
| 7,660,902 B2 | 2/2010 | Graham et al. | |
| 7,711,771 B2 | 5/2010 | Kirnos | |
| 7,756,821 B2 | 7/2010 | Havens et al. | |
| 7,821,405 B2 | 10/2010 | Heidloff et al. | |
| 7,827,299 B2 * | 11/2010 | Cadarette | G06F 17/30516 707/609 |
| 7,904,303 B2 | 3/2011 | Chien et al. | |
| 7,908,183 B2 | 3/2011 | Jacobi et al. | |
| 8,041,672 B2 | 10/2011 | Ogawa et al. | |
| 8,132,111 B2 | 3/2012 | Baron et al. | |
| 8,156,059 B2 | 4/2012 | Dunning et al. | |
| 8,194,986 B2 | 6/2012 | Conwell | |
| 8,196,047 B2 | 6/2012 | Fisher et al. | |
| 8,285,700 B2 | 10/2012 | Steelberg et al. | |
| 8,298,087 B1 | 10/2012 | Smith | |
| 8,407,613 B2 | 3/2013 | Hope | |
| 8,412,731 B2 | 4/2013 | Aubert et al. | |
| 8,417,000 B1 | 4/2013 | Mendis | |
| 8,429,565 B2 | 4/2013 | Agarawala et al. | |
| 8,458,174 B1 | 6/2013 | Duerig | |
| 8,464,184 B1 | 6/2013 | Cook et al. | |
| 8,467,955 B2 | 6/2013 | Jiang et al. | |
| 8,468,164 B1 | 6/2013 | Paleja et al. | |
| 8,479,122 B2 | 7/2013 | Hotelling et al. | |
| 8,504,565 B2 | 8/2013 | Pitts | |
| 8,522,230 B2 | 8/2013 | Nathan et al. | |
| 8,522,258 B1 | 8/2013 | Shaw | |
| 8,532,400 B1 | 9/2013 | Babenko et al. | |
| 8,547,352 B2 | 10/2013 | Park et al. | |
| 8,548,844 B2 | 10/2013 | Steelberg et al. | |
| 8,555,173 B2 | 10/2013 | Kast | |
| 8,560,975 B2 | 10/2013 | Beaver et al. | |
| 8,571,331 B2 | 10/2013 | Cifarelli | |
| 8,584,022 B1 | 11/2013 | O'Shaughnessy et al. | |
| 8,612,439 B2 | 12/2013 | Prahlad et al. | |
| 8,612,470 B1 | 12/2013 | Fushman et al. | |
| 8,624,836 B1 | 1/2014 | Miller et al. | |
| 8,638,312 B2 | 1/2014 | Lim | |
| 8,644,688 B2 | 2/2014 | Fishman et al. | |
| 8,661,053 B2 | 2/2014 | Flynn et al. | |
| 8,670,597 B2 | 3/2014 | Petrou et al. | |
| 2002/0099844 A1 | 7/2002 | Baumann et al. | |
| 2002/0112116 A1 | 8/2002 | Nelson | |
| 2002/0116399 A1 | 8/2002 | Camps et al. | |
| 2002/0178271 A1 | 11/2002 | Graham et al. | |
| 2002/0184375 A1 | 12/2002 | Wagner et al. | |
| 2003/0184653 A1 | 10/2003 | Ohkubo | |
| 2003/0208490 A1 | 11/2003 | Larrea et al. | |
| 2004/0135904 A1 | 7/2004 | Shiota et al. | |
| 2005/0033777 A1 * | 2/2005 | Moraes | G06F 17/30575 |
| 2005/0131992 A1 | 6/2005 | Goldstein et al. | |
| 2006/0059174 A1 | 3/2006 | Mese et al. | |
| 2006/0159127 A1 | 7/2006 | Childress et al. | |
| 2006/0229932 A1 | 10/2006 | Zollo et al. | |
| 2006/0242581 A1 | 10/2006 | Manion et al. | |
| 2008/0123904 A1 | 5/2008 | Sakamoto et al. | |
| 2008/0126476 A1 | 5/2008 | Nicholas et al. | |
| 2008/0165141 A1 | 7/2008 | Christie | |
| 2008/0177623 A1 | 7/2008 | Fritsch et al. | |
| 2008/0195956 A1 | 8/2008 | Baron et al. | |
| 2008/0270398 A1 | 10/2008 | Landau et al. | |
| 2009/0112868 A1 * | 4/2009 | Rajamani | G06F 17/30867 |
| 2009/0327975 A1 | 12/2009 | Stedman | |
| 2010/0017426 A1 | 1/2010 | Marston | |
| 2010/0046392 A1 | 2/2010 | Childress et al. | |
| 2010/0070707 A1 | 3/2010 | Nishimura | |
| 2010/0161441 A1 | 6/2010 | Hounsell | |
| 2010/0211575 A1 | 8/2010 | Collins et al. | |
| 2010/0241971 A1 | 9/2010 | Zuber | |
| 2010/0250337 A1 | 9/2010 | Kassaei | |
| 2010/0251305 A1 | 9/2010 | Kimble et al. | |
| 2010/0256981 A1 | 10/2010 | Nielsen et al. | |
| 2010/0332846 A1 | 12/2010 | Bowden et al. | |
| 2010/0332958 A1 | 12/2010 | Weinberger et al. | |
| 2011/0010672 A1 | 1/2011 | Hope | |
| 2011/0044512 A1 | 2/2011 | Bambha et al. | |
| 2011/0208668 A1 | 8/2011 | Phillips | |
| 2011/0289423 A1 | 11/2011 | Kim et al. | |
| 2012/0032436 A1 | 2/2012 | Zantout et al. | |
| 2012/0072449 A1 * | 3/2012 | Patch | G06F 17/30607 707/770 |
| 2012/0078845 A1 | 3/2012 | Kasbekar et al. | |
| 2012/0089610 A1 | 4/2012 | Agrawal et al. | |
| 2012/0096046 A1 | 4/2012 | Kucera | |
| 2012/0136936 A1 | 5/2012 | Quintuna | |
| 2012/0192086 A1 | 7/2012 | Ghods et al. | |
| 2012/0197980 A1 | 8/2012 | Terleski et al. | |
| 2012/0213404 A1 | 8/2012 | Steiner | |
| 2012/0233227 A1 | 9/2012 | Alexander et al. | |
| 2012/0246153 A1 * | 9/2012 | Pehle | G06F 17/30864 707/723 |
| 2012/0254332 A1 | 10/2012 | Irvin | |
| 2012/0290609 A1 | 11/2012 | Britt | |
| 2012/0290926 A1 * | 11/2012 | Kapadia | G06F 17/2288 715/255 |
| 2012/0303477 A1 | 11/2012 | Ben-Itzhak | |
| 2012/0303684 A1 | 11/2012 | Sakurai et al. | |
| 2012/0324368 A1 | 12/2012 | Putz et al. | |
| 2013/0024464 A1 | 1/2013 | Berner et al. | |
| 2013/0073976 A1 | 3/2013 | McDonald et al. | |
| 2013/0080940 A1 | 3/2013 | Reeves et al. | |
| 2013/0104080 A1 | 4/2013 | Bosworth et al. | |
| 2013/0132896 A1 | 5/2013 | Lee et al. | |
| 2013/0138674 A1 | 5/2013 | Jeong et al. | |
| 2013/0138685 A1 | 5/2013 | Brucher et al. | |
| 2013/0173637 A1 | 7/2013 | Kim et al. | |
| 2013/0185638 A1 | 7/2013 | Tischer | |
| 2013/0188886 A1 | 7/2013 | Petrou et al. | |
| 2013/0202198 A1 | 8/2013 | Adam et al. | |
| 2013/0263289 A1 | 10/2013 | Vijayan et al. | |
| 2013/0339435 A1 | 12/2013 | De Armas | |
| 2014/0019317 A1 | 1/2014 | Casares et al. | |
| 2014/0019910 A1 | 1/2014 | Kim et al. | |
| 2014/0029798 A1 | 1/2014 | Flynn et al. | |
| 2014/0068443 A1 | 3/2014 | Eng et al. | |
| 2014/0164535 A1 | 6/2014 | Lynch et al. | |
| 2014/0236722 A1 | 8/2014 | Rathus et al. | |
| 2014/0317552 A1 * | 10/2014 | Romatoski | G06F 19/321 715/780 |
| 2015/0193521 A1 | 7/2015 | Schoeffler et al. | |

FOREIGN PATENT DOCUMENTS

| | | |
|---|---|---|
| EP | 2458512 A1 | 11/2010 |
| EP | 1275222 B1 | 10/2011 |
| WO | 0051021 A3 | 12/2001 |
| WO | 03090096 A1 | 10/2003 |
| WO | 2007085083 A1 | 8/2007 |
| WO | 2009032712 A3 | 5/2009 |
| WO | WO2012092025 | 7/2012 |

OTHER PUBLICATIONS

Flayvr, A. Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.

Larson, Michael, "Probing Network Characteristics: A Distributed Network Performance Framework", Dr. Dobb's Journal, Jun. 2004, pp. 22-29.

Lowe, D., "Object recognition from local scale-invariant features," International Conference on Computer Vision Corfu, Greece (Sep. 1999) pp. 1150-1157.

ISR & Written Opinion, RE: Application # PCT/US2015/020375; Jun. 12, 2015.

ISR and Written Opinion of the International Searching Authority for International Application No. PCT/US2015010618, Mar. 25, 2015.

(56) References Cited

OTHER PUBLICATIONS

ISR & Written Opinion, RE: Application #PCT/US2015/020378 citing new art; Aug. 18, 2015.

* cited by examiner

METHODS FOR DISPLAYING OBJECT HISTORY INFORMATION

BACKGROUND

The disclosure herein relates generally to methods for displaying history information.

Computer systems are known that allow for shared access to objects. As one example, shared storage systems can allow users to create or store objects such as files at a remote server, access the files via a network such as the internet, grant shared access to the files to other users, and in some examples, edit the file using a file creation and editing system that is associated with the shared storage system. As another example, a calendar application can allow a user to create a calendar object and grant shared access to the calendar objects to other users. As another example, a task management application can allow creation of task objects for assigning tasks to other users, thus granting the other users shared access to the task object. Shared access to an object by a second user can include any or all of the abilities to view the object, modify the object, share the object with additional users, make copies of the object, or delete the object. These types of systems are referred to herein as shared access systems. Shared access systems can allow actions to be taken with respect to an object. As an example, online document storage and editing systems are known that store files and allow multiple users who have been granted access to a particular file to take actions such as viewing or editing the file. In some shared access systems, users can be provided with information regarding actions taken with respect to certain objects by other users.

SUMMARY

The disclosure relates to methods for displaying history information.

One aspect of the disclosed embodiments is a method that includes receiving, at one or more server computers from a user, a search request including a search input. The method also includes identifying, at the one or more server computers, a history information item based on the search input. The history information item includes information describing a prior state of the object. The method also includes determining, at one or more server computers, whether information describing a current state of the object corresponds to the search input. The method also includes outputting a prior-state based search result item that identifies the object and includes information based on the history information item. If the information describing the current state of the object corresponds to the search input, the method includes outputting a current-state based search result item that includes a link for accessing the object.

Another aspect of the disclosed embodiments is a method that includes receiving, at one or more server computers from a user, a search request including a search input. The method also includes identifying, at the one or more server computers, a history information item based on the search input. The history information item includes information describing a prior state of the object. The method also includes determining, at the one or more server computers, whether the object is currently accessible to the user. If the object is currently accessible to the user, the method includes outputting a current search result item that includes a link for accessing the object. If the object is not currently accessible to the user, the method includes outputting a historical search result item that identifies the object and includes information based on the history information item.

Another aspect of the disclosed embodiments is a method that includes receiving, at one or more server computers from a user, a search request including a search input. The method also includes generating, at the one or more server computers, historical search result items based on the search input and history information items. The method also includes generating, at the one or more server computers, current search result items based on object information, and generating, at the one or more server computers, a filtered set of the historical search result items by excluding historical search result items that correspond to objects that are represented by the current search result items. The method also includes outputting, for display, the current search result items and the filtered set of the historical search result items.

Another aspect of the disclosed embodiments is a method that includes receiving, at one or more server computers from a user, a search request including a search input. Another aspect of the disclosed embodiments is a method that includes identifying one or more objects from a plurality of objects that are stored at the one or more server computers based on a comparison of the search input with history information items that describe prior states of respective objects and based on a comparison of the search input with object information that describes a current state of respective objects. The method also includes outputting, for display, a search result item for each of the one or more objects, each search result item including information based on at least one of the history information items or the object information.

Another aspect of the disclosed embodiments is a method that includes receiving, at one or more server computers from a user, a search request including a search input having a plurality of input components. The method also includes identifying an object based on object information that matches a first subset of the input components from the search input but does not match at least one input component from the search input, wherein the object information describes a current state of the object. The method also includes identifying a history information item that matches a second subset of the input components from the search input but does not match at least one input component from the search input, wherein the history information item describes a prior state of the object. If each input component from the plurality of input components is included in at least one of the first subset of input component or the second subset of input components, the method also includes outputting, for display, a search result item for the object, the search result item including information based on at least one of the history information item or the object information.

BRIEF DESCRIPTION OF THE DRAWINGS

The description herein makes reference to the accompanying drawings wherein like reference numerals refer to like parts throughout the several views, and wherein.

DETAILED DESCRIPTION

Methods for displaying history information are displayed herein. In shared access systems, search functions are provided that allow users to search for objects, such as documents. When multiple users are able view and/or modify an object, a user may not be aware of recent changes to the object, and because of these changes, the object may not appear in search results as the user expects. The systems and methods described herein utilize history information to generate historical search result items in situations where, previously, an object would have been identified in response to a search but is not currently identifiable in response to the search. This can allow a document to be found, or can allow a user to understand why a document is no longer identified as a search result in situations where information associated with the object has changed, the object has been moved, the object has been deleted, the object has been unshared, or other changes have occurred with respect to the object.

Figure 1:
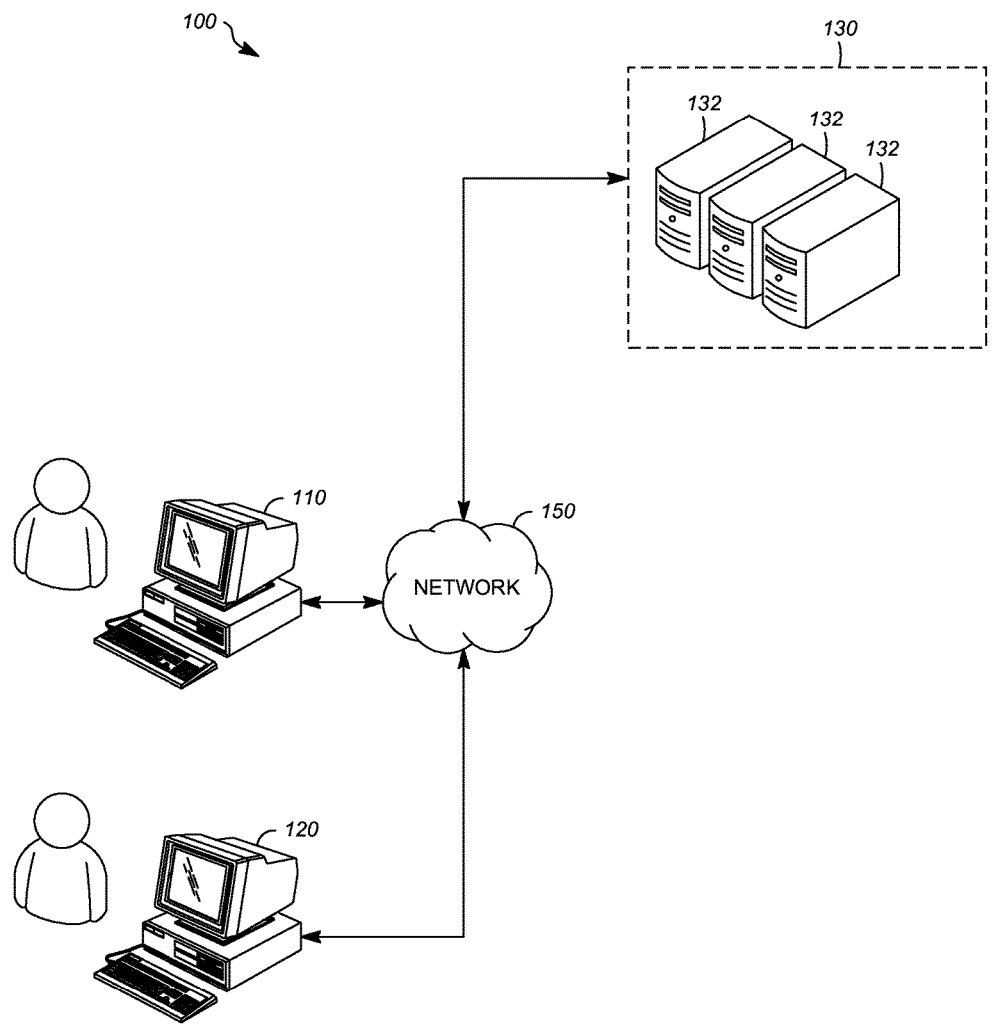
FIG. 1 is a block diagram showing an example of an environment in which a system for displaying object history information can be implemented.

FIG. 1 shows an example of an environment 100 in which a system for displaying object history information can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. As used here, a shared workspace is any manner of system, program, or interface that allows a defined group of users to utilize an access-restricted system in which information can be shared between users for the purpose of collaboratively working on a project. As will be discussed below, shared workspaces can implement document storage, creation, and editing functions. In some implementations, the application hosting service 130 allows a particular shared workspace to be accessed upon presentation of a credential, such as a user-name and password combination, that are associated with a registered user of that particular shared workspace. In some implementations, one or more users of each shared workspace are able to grant access to additional users or revoke access from existing users.

Figure 2:
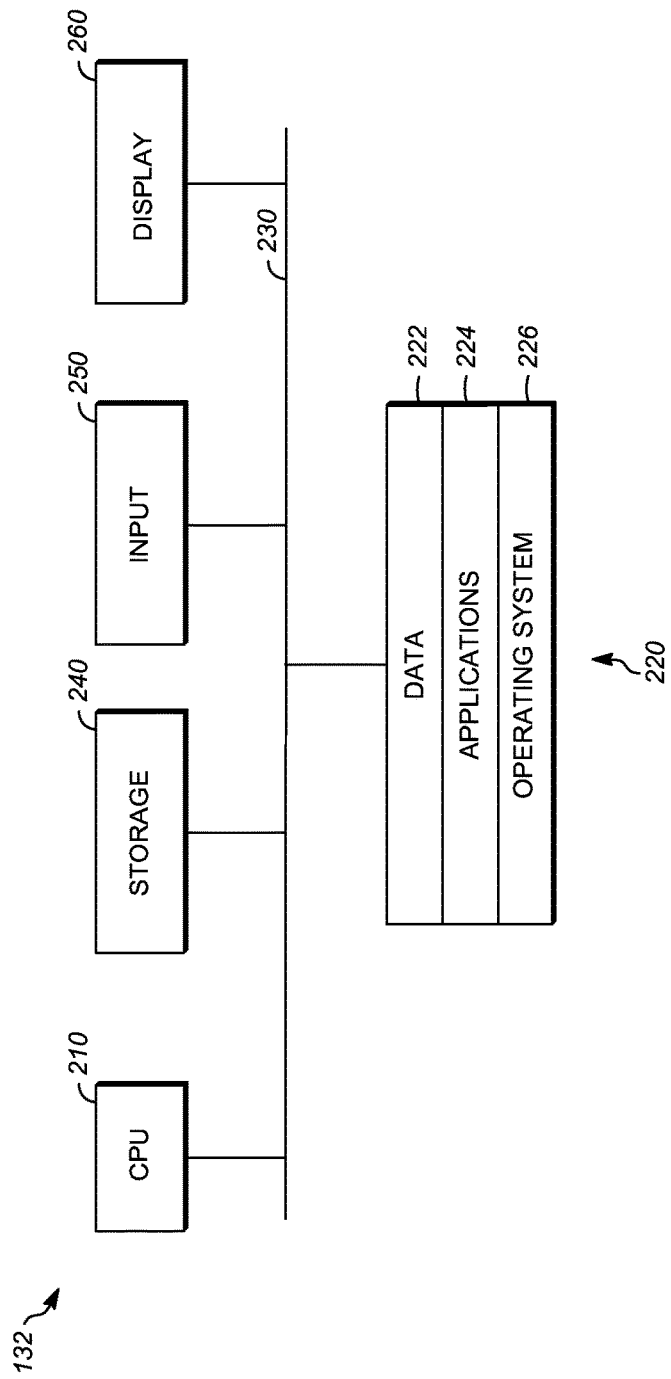
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
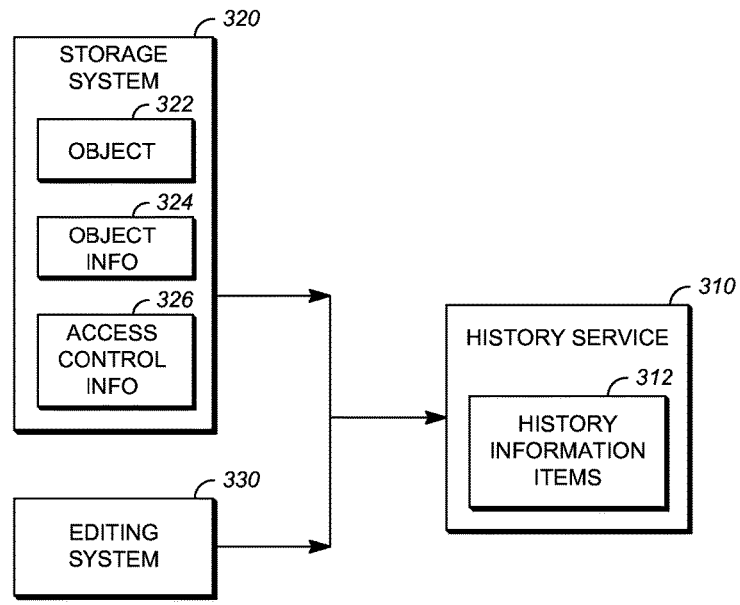
FIG. 3 is a block diagram showing a plurality of shared access systems and a history service.

FIG. 3 is a block diagram showing a plurality of shared access systems that are in communication with a history service 310. In the illustrated example, the shared access systems include a storage system 320 and an editing system 330. The storage system 320 and the editing system 330 are examples of systems that can be in communication with the history service 310. It should be understood, however, that different or additional systems could be utilized in conjunction with the history service 310. Each of these systems and services can be, for example, provided in the form of software instructions that are executed by a processor or computer, such as the one or more server computers 132 of the application hosting service 130.

The storage system 320 is operable to provide a remotely accessible interface by which users can store files, access those files, and share those files with other users. The storage system 320 can provide access via, for example, a web based interface that can be output for display in the context of a web browser at a client device, such as the user system 110. The storage system 320 can store objects 322, object information 324 (e.g. metadata) that describes the current state of each of the objects 322, and access control information 326 for each of the objects 322 that identifies users that are authorized to access the objects 322 and can describe a specific type of access that is authorized for each user. Thus, for example, one of the objects 322 will not be accessible to a specified user if that user is not designated by the access control information 326 as being authorized to access the object 322. Thus, as an example, the objects 322 at the storage system 320 can include a first group of objects that are accessible to the user and a second group of objects that are not accessible to the user, as determined based on the access control information 326.

The access control information 326 for each of the object 322 can be an access control list in any suitable form as is well known in the art. Access to the object information 324 for each of the objects can be subject to access control, such that a portion of the object information 324 will be available to a specified user based on the access control information 326.

The editing system 330 is a network accessible system that allows for the creation and editing of documents. The editing system 330 can, in some implementations, be utilized in conjunction with the storage system 320 to obtain documents from the storage system 320 and to store documents at the storage system 320. In some implementations, the editing system 330 is accessible via a web browser based interface that can be output for display at a client device, such as at the user system 110.

The history service 310 is operable to receive information from shared access services. The history service 310 can store information describing the objects 322 along with information, such as a time stamp, representing the time at which the object corresponded to the information. As one example, the information stored by the history service 310 can describe the current state of one of the objects 322 at a specified time, where the current state information can include an identity of the object a name of the object a description of the object, keywords describing the object, a current location (e.g. folder) for the object, current access control information for the object, or any other data regarding the object. The information stored by the history service 310 can also describe actions taken with respect to objects using the shared access services including, for example, an identity of an object, an action taken with respect to that object, the identities of one or more users associated with the action, information related to the time at which the action occurred, and information identifying one or more systems that were involved executing the action with respect to the object. In these examples, the information describing the identity of the object can be a unique internal identifier that is used by the history service 310 and shared access systems that access the object, and is not user-modifiable, thus allowing a file to be identified regardless of changes to information associated with the object, such as its name and location. As an example, a unique object ID can be assigned to each object, thus allowing identification of objects that correspond to history information items 312, and allowing determinations to be made as to whether multiple history information items 312 correspond to the same item.

The information that is received by the history service 310 can be stored in the form of history information items 312, which can be stored at the history service 310 or can be stored such that they are accessible to the history service 310. For example, the history service 310 can be implemented by the application hosting service 130, and the history information items 312 can be stored at storage devices that are associated with and managed by the application hosting service 130. The history information items 312 can be stored in any suitable form. As one example, the history information items 312 can be stored as objects in a data base.

The history information items 312 can be utilized to provide insight to users as to the prior states of one or more objects and the actions that have been taken with respect to one or more objects. As will be explained herein, the history information items 312 can be incorporated in historical search result items that are output for display in response to a search request.

Figure 4:
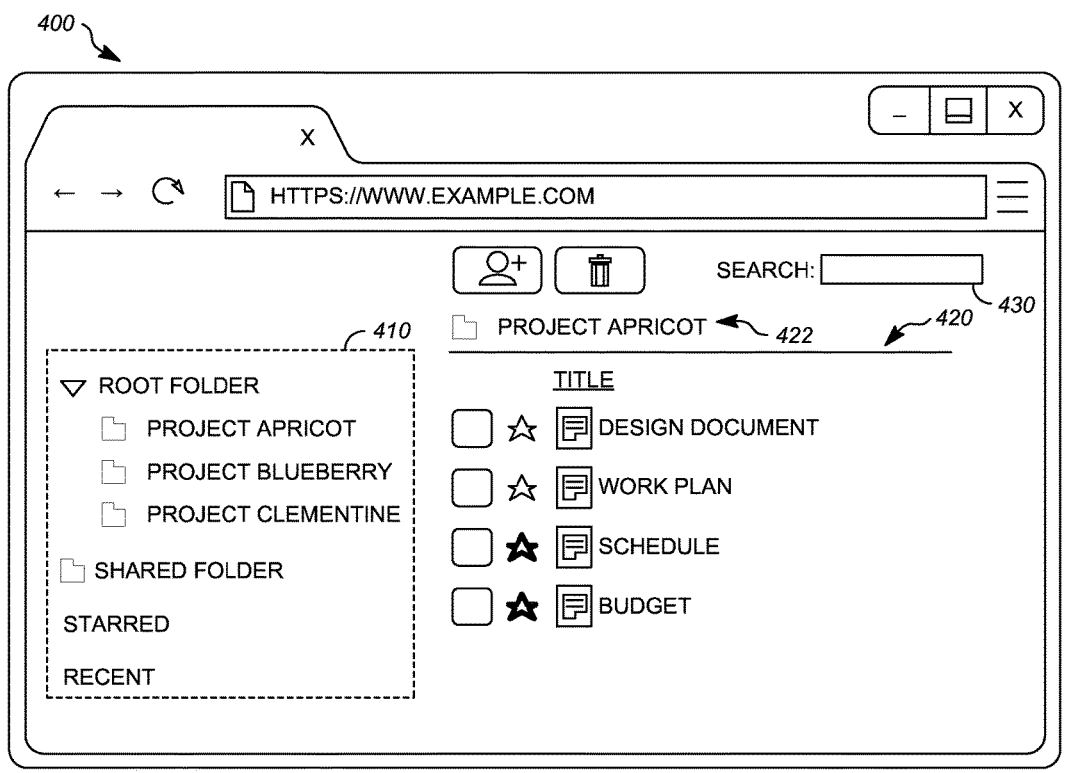
FIG. 4 is an illustration showing an example of an interface screen for a storage system.

FIG. 4 shows an example of an interface screen 400 for the storage system 320. The interface screen 400 can, in some implementations be displayed in the context of a web browser by way of a web page that is encoded in a mark-up language such as HTML that is transmitted from the application hosting service 130 to the user system 110 and output for display at the user system 110. In other examples, the interface screen 400 can be presented in a different type of application, such as a standalone application.

The storage system 320 can implement storage of objects, such as documents, images or other files, in a hierarchical storage arrangement that includes folders. Other types of storage organization methods could be implemented. The interface screen 400 can include a navigation area 410 showing folders and/or attribute-based collections of documents (recent items, favorite items, etc.) that are accessible to a user to whom the interface screen 400 is output for display. The interface screen 400 can also include an object area 420 where the contents or members of a folder or collection are displayed. In the illustrated example, the object area is in the form of a list of objects. The user can select one or more objects and perform actions with respect to those objects using interface elements, such as buttons. Examples of actions that can be performed with respect to objects include viewing, opening, moving, and deleting objects. In some implementations, additional information can be displayed in the object area 420. The additional information can include, for example, an identity of an owner of each object, and a time of creation and/or modification of each object. The interface screen can further include a search box 430, which the user can use to provide a search input, such as a keyword, as a search term for searching for objects that are stored at the storage system. A search at the search box can be made with respect to a single folder or collection of documents, or with respect to multiple folders or collections of documents. In one implementation, a search is conducted with respect to a folder or collection currently displayed in the object area 420, and a search made from a root folder can encompass all of the objects that are accessible to the user.

Figure 5:
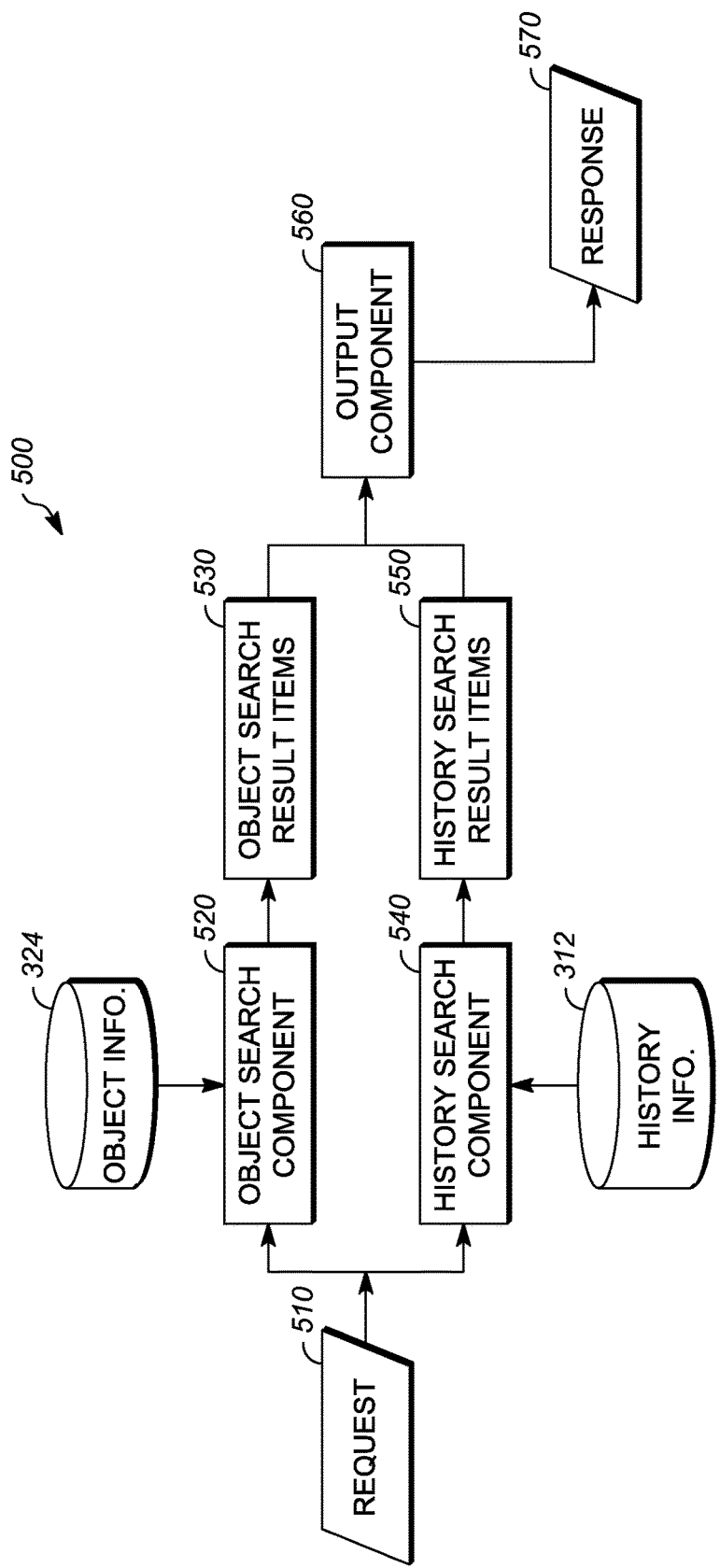
FIG. 5 is a block diagram showing generation of object search results.

FIG. 5 is a block diagram showing a system 500 for generation of object search results. A search request 510 is received, for example, from a user via the search box of the interface screen 400. The search request 510 can include a search input. The search input can be any type of data with respect to which a search for objects can be conducted, such as text. The system 500 is operable to determine whether the search input corresponds to information describing objects, such as the objects 322. As used herein, a search input corresponds to information when all or part of the search input matches the information using any suitable searching technique, such as literal search techniques and semantic search techniques. As one example, the search input can include a keyword, such as text corresponding to the name of an object that the user is looking for. As another example, the search input can include a search constraint or predicate that specifies information relating to an object that the user is looking for, such as information specifying a sharing status (e.g. "shared with Bob") or location within a folder or other organizational structure (e.g. "under the folder hierarchy rooted at 'Family Photos'"). The search input can include multiple components, such as one or more keywords and/or one or more constraints or predicates (e.g. "In folder Photos and shared with Bob"). In some implementations, search inputs including multiple components are searched with respect to all of those components for both object searches and historical searches. In other implementations, some components of search inputs including multiple components are searched with respect to object searches and historical searches, while other components are searched with respect to only one of object searches or historical searches. For example, a particular constraint or predicate might only be relevant with respect to object searches, such as a constraint limiting results to objects that are currently being viewed by other users.

The search input of the search request 510 can be utilized as an input for each of an object search component 520 and a history search component 540. The object search component 520 is configured to generate search results representing the current states of objects that are currently accessible to the user. The object search component 520 produces, as an output, object search result items 530. The object search result items 530 each identify one of the objects 322 and include information that describes a current state of the object.

The object search component 520 can generate the object search result items 530 based on the search input of the search request 510 and information regarding the current state of the objects 322 that are stored at the storage system 320. This information can be, for example, the object information 324, and/or can be based on the objects 322 themselves. The object search component 520 can search with respect to a subset of the objects 322 that are stored at the storage system 320, where the subset includes the objects 322 that the user is authorized to access but excludes the objects 322 that the user is not authorized to access. A determination as to whether or not a specified user is authorized to access a specified object can be made, for example, using access control information that is associated with the object, such as an access control list.

The history search component 540 is configured to generate search results representing prior states of objects that are currently stored at the storage system 320 or were previously stored at the storage system 320, and with respect to objects which the user who submits the search is currently authorized to access or was previously authorized to access. Thus, the history search component 540 can help users to identify files based on their previous states, and can help users identify files that previously existed and were accessible to the user, but no longer exist or are no longer accessible to the user.

The history search component 540 produces, as an output, history search result items 550. The history search result items 550 each identify one of the objects 322 and include information that describes a prior state of the object. The history search component 540 can generate the history search result items 550 based on the search input of the search request 510 and information regarding a prior state of the objects 322 that are stored at the storage system 320. This information can be or include, for example, the history information items 312. The history information items 312 that are accessible to a user can describe states of objects and/or actions taken with respect to objects at points in time when the user was authorized to access the object.

In one example, the history search component 540 identifies one or more history information items 312 that relate to one of the objects 322 based on the search input of the search request 510, and outputs one or more history search result items 550. Multiple history search result items 550 can be generated in relation to a single one of the objects 322. For example, a first history search result item can relate to a state of the object at a particular point in time, a second history search result item can relate the state of the object at the time a first action (e.g. moved, deleted, edited, etc.) was taken with respect to the object and a third history search result item can relate to a second action taken with respect to the object.

The object search result items 530 and the history search result items 550 can be provided to an output component 560. The output component 560 is operable to generate information, such as in the form of a response 570, based on one or both of the object search result items 530 and the history search result items 550. The response can be, for example, an interface screen, a portion of an interface, or information that is utilized for generating an interface screen that can be output for display to a user, such as at the user system 110. The response can include information that relates to multiple objects. For example, a search for a document title could produce results that represent several different documents having that title, such as documents located in different folders and having different contents.

The output component 560 can determine whether two or more search result items from the object search result items 530 and/or the history search result items 550 relate to a single one of the objects 322. Thus, the output component 560 could, as examples, identify two or more object search result items 530 as relating to a single object, could identify two or more history search result items 550 as relating to a single object, and/or could identify a set of one or more object search result items 530 and one or more history search result items 550 as relating to a single object. This can be done, for example, based on the unique identifier for each of the objects 322 at the storage system 320. This determination can be used for grouping or filtering results.

As an example, the output component can output a single search result item for each of one or more objects that are identified based on the search input of the search request 510, where each search result item includes information based on at least one of the history information items 312 or the object information 324.

The output component 560, in some implementations, generates a set of search results based on the object search result items 530 and the history search result items 550 by excluding at least some of the object search result items 530 or at least some of the history search result items. This can include generating a filtered set of either or both of the object search result items 530 or the history search result items 550.

The output component 560 can select, with respect to a specified object, a single one of the history search result items 550 that relates to that object for inclusion in the response 570. In one example, the output component 560 selects one of the history search result items 550 for the object based on the time at which the action described by the history search result item occurred. For example, the history search result item that is selected can be the one that described the most recent action taken with respect to a specific object. In another example, the output component selects one of the history search results items 550 based on a change to a value that corresponds to the search input. Thus, if the user searches for "tasks" a history item relating to an action that changed the name of an object from "tasks" to "assignments" could be identified and selected by the output component 560.

The output component 560 can, for an object, determine whether the object is currently accessible to the user who made the search request 510. If the object is currently accessible to the user, the response 570 can include a link to the object as part of the search result. Thus, for example if a search result based on the history information items 312 refers to an object that is currently accessible to the user, the response 570 can include a link to the object. Whether or not an object is currently accessible to a user can be determined using the access control information 326.

The output component 560 can, in some implementations, filter some or all of the history search result items 550 based on the object search result items. In some implementations, only one search result item is output for display with respect to each unique object that is identified by the search.

As one example, the output component 560 determines whether an object represented by one or more of the history search result items 550 is also represented by one or more of the object search result items 530. This can be done based on the unique identifier for each of the objects 322 at the storage system 320. Thus, if one of the objects 322 is represented by one of the object search result items 530, the history search result items that relate to that object can be filtered and thus excluded from the response 570. In this implementation, the output component 560 can generated a filtered set of the history search result items 550 by excluding items that correspond to objects that are represented by the object search result items 530.

As another example, by filtering the results using the output component 560, if information describing the current state of an object, such as the object information 324, corresponds to the search input of the search request 510, the output component 560 can include in the response 570 a result reflecting the current-state of the object. This can include a link for accessing the object. Alternatively, if the information describing the current state of the object does not correspond to the search input, the output component 560 can include in the response information reflecting a prior-state of the object, including information that identifies the object and information regarding the objection from the history information items 312.

As another example, if an object identified based on the search input of the search request 510 is currently accessible to the user, the output component 560 can include in the response a current search result item that includes a link for accessing the object based on the object search result items 530, and if the object is not currently accessible to the user, the output component can instead output a historical search result item based on the history search result items 550, which identifies the object and includes information based on the history information items 312.

As another example, the response 570 that is generated by the output component 560 can include information identifying an object based on partial matches with respect to each of the history information items 312 and the object information 324. The object search component 520 identifies objects based on matches to some, but not all of the components of a multiple component search input, and the history search component 540 also identifies objects based on matches to some, but not all of the components of search input. The output component, upon receiving the object search results 530 and the history search result items 550, can include an object for which only partial matches were made (i.e. less than all components of the search input were matched). In one example, one or more components of the search input are not matched based on the object information 324, but those unmatched components are matched for the same object based on the history information items 312. Thus, in this example, all of the components of the search input are matched based on at least one of the object information 324 or the history information items 312, but at least one of the components is matched based on only one of the object information 324 or the history information items 312, and a search result describing the object is included in the response 570.

Figure 6A:
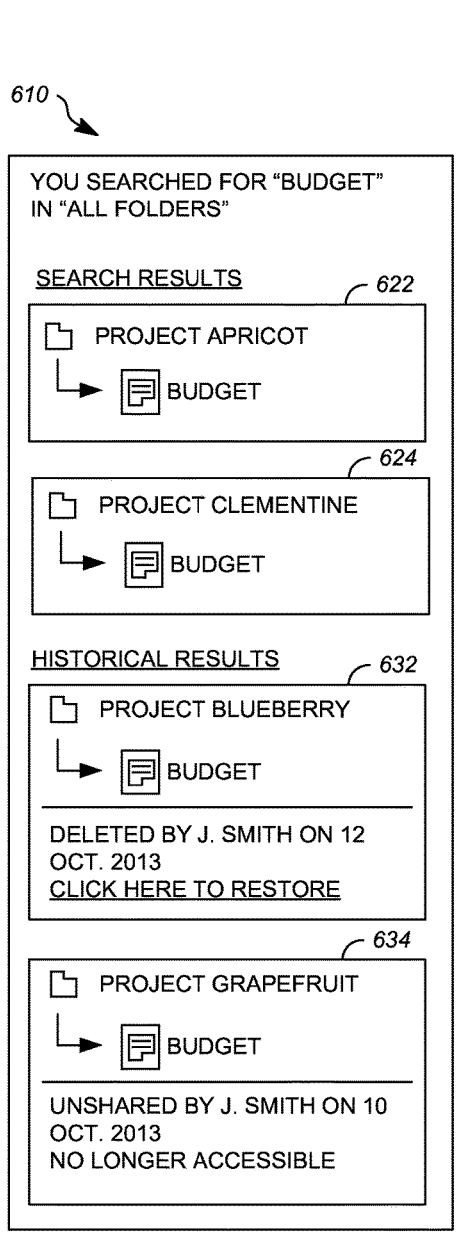
FIGS. 6A-6C are examples object search results.
Figure 6B:
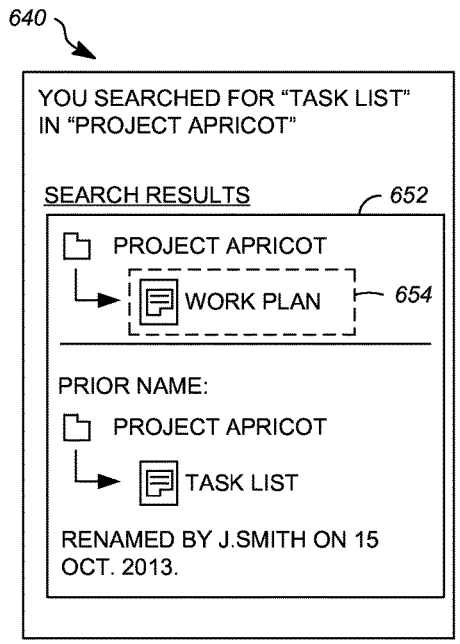
Figure 6C:
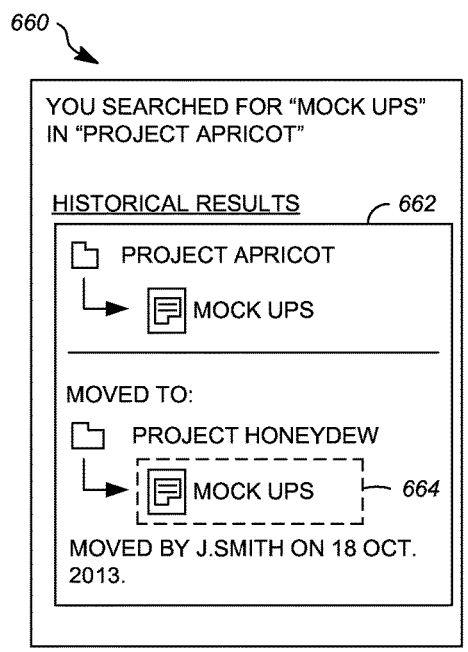

FIGS. 6A-6C are examples of object search results that can be output for display, for example, as part of an interface screen for the storage system 320. In FIG. 6A, search results 610 are output for display in response to a search for the term "budget." A first search result 622 and a second search result 624 are based on the current state of objects, each of which are named "Budget" but are different documents that are located in different folders. The first search result 622 and the second search result 624 can be identified, for example, using the object information 324 as described in connection with the object search component 520. The first search result 622 and the second search result 624 can each be utilized to access the objects that they describe, such as by including a user interface element such as a link (e.g. a hyperlink) to the object. A third search result 632 identifies an object and a deletion action that was taken with respect to the object. The third search result 632 also includes an interface element such as a link for reversing the action, in this case, by undeleting the object. A fourth search result 634 identifies an object, and includes information describing an unshare action, by which the user lost authorization to access the object. The third search result 632 and the fourth search result 634 each refer to objects having the name "budget," but refer to different objects that are stored in different locations. The third search result 632 and the fourth search result 634 can be identified, for example, using the history information items 312 as described in connection with the history search component 540.

In FIG. 6B, search results 640 are output for display in response to a search for the term "task list." A first search result 652 includes information based on both the object information 324 and information based on the history information items 312. In this example, an object previously named "task list" is identified based on the history information items 312, which in this case indicate that the object was renamed as "work plan." Because the object was renamed, it is not currently identifiable using the object information 324. However, the object information 324 corresponding to the respective object 322 is incorporated in the first search result 652, by identification of the document titled "work plan" and inclusion of a link 654 to the document. By incorporating information based on the history information items 312, the user is aware that this object was previously named "task list" but was renamed.

In FIG. 6C, search results 660 are output for display in response to a search for the term "mock ups" within a folder titled "Project Apricot." A first search result 662 includes information based on the history information items 312. In this example, a document named "mock ups" that was previously located in the "Project Apricot" folder is identified based on the history information items 312, which in this case indicate that the document was moved to a folder titled "Project Honeydew." The first search result 662 includes a link 664 to the document. By incorporating information based on the history information items 312, the user is aware that this object still exists, but was moved.

Figure 7:
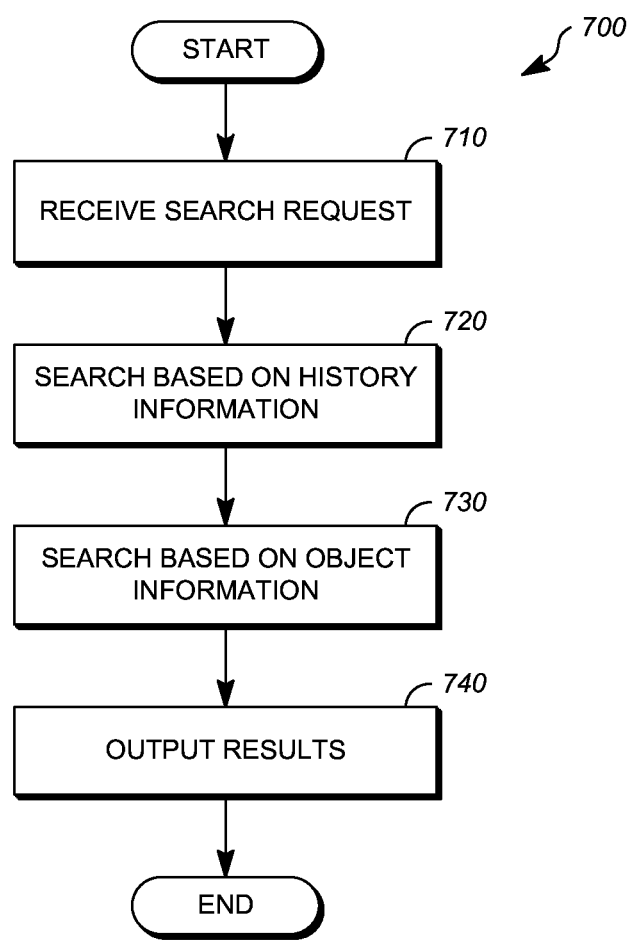
FIG. 7 is a flowchart showing an example of a process for displaying object history information.

FIG. 7 is a flow chart showing a process 700 for displaying object history information. The operations described in connection with the process 700 can be performed at one or more computers, such as at the one or more server computers 132 of the application hosting service 130. When an operation is performed by one or more computers, it is completed when it is performed by one computer. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of one of the server computers 132 and be executable by the CPU 210 thereof.

In operation 710, a search request is received. In this context, receiving means any manner by which the search request becomes available. For example, a search request can be received at the one or more server computers 132 by transmission over a network, retrieval from a storage device, an input made at a human interface device that is associated with the one or more server computers, or in any other suitable manner. The search request can include a search input, as previously described. The search request can, for example, be as described with respect to the search request 510.

In operation 720, a search is conducted based on history information. This can be performed, for example, in the manner described with respect to the history search component 540.

In operation 730, a search is conducted based on object information. This can be performed, for example, in the manner described with respect to the object search component 520.

In operation 740, results are generated output in response to the search request. This can be performed, for example, in the manner described with respect to the output component 560. The process then ends.

It should be understood that search results based on object history information can be output in many suitable forms. As a further example, FIGS. 8A-8D show are examples showing interface screens including search results.

Figure 8A:
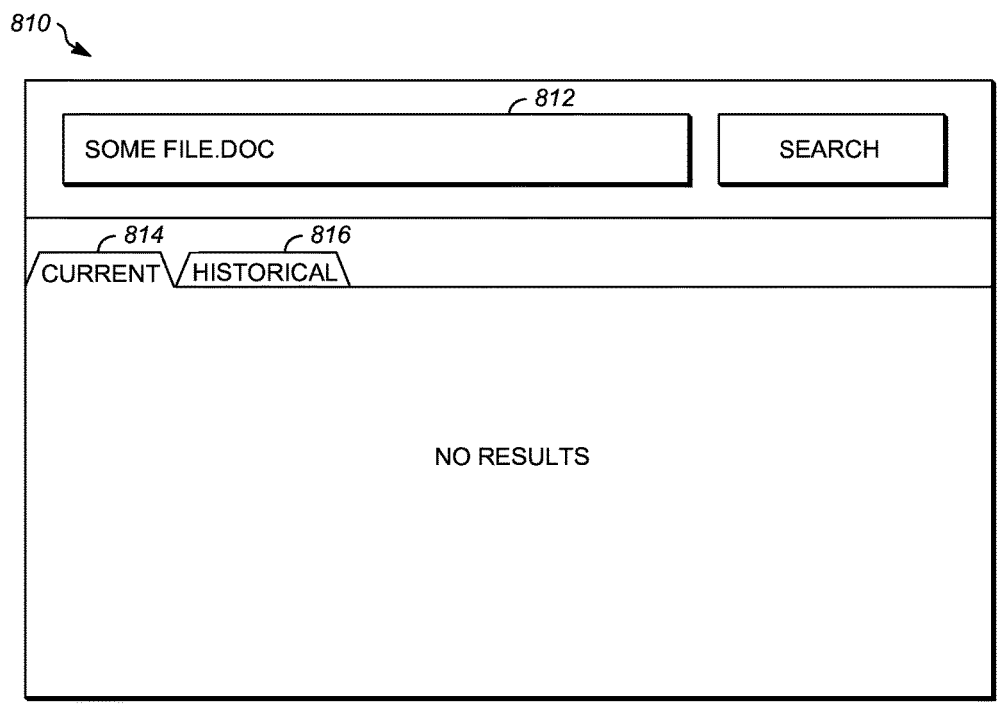
FIGS. 8A-D are examples showing interface screens including search results.
Figure 8B:
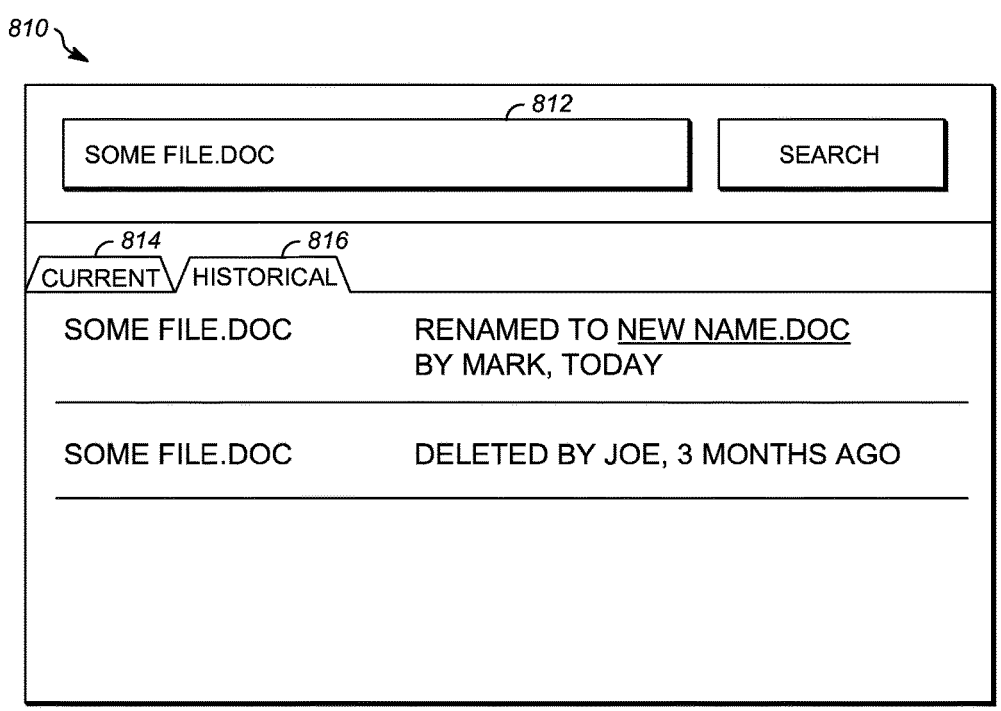

In FIG. 8A, an interface screen 810 shows a search field 812 and a tabbed results area including a current results tab 814 and a historical results tab 816. In this example, the user has entered a search input "Some File.DOC" in the search field 812. The current results tab 814 is active, and a text legend indicates that no results were found in response to the search. Because the user believes that the file should be present, the user switches to the historical results tab 816. As shown in FIG. 8B, the historical results tab 816 includes a first result that includes information indicating that a file named "Some File.DOC" was renamed to "New Name-.DOC," and information indicating the identity of the user who made the change as well as information relating to the time at which the change happened. The historical results tab 816 includes a second result that includes information indicating that a file named "Some File.DOC" was deleted, and information indicating the identity of the user who made the change as well as information relating to the time at which the change happened. In files referred to in the first search result and the second search result can be different objects with the same name.

Figure 8C:
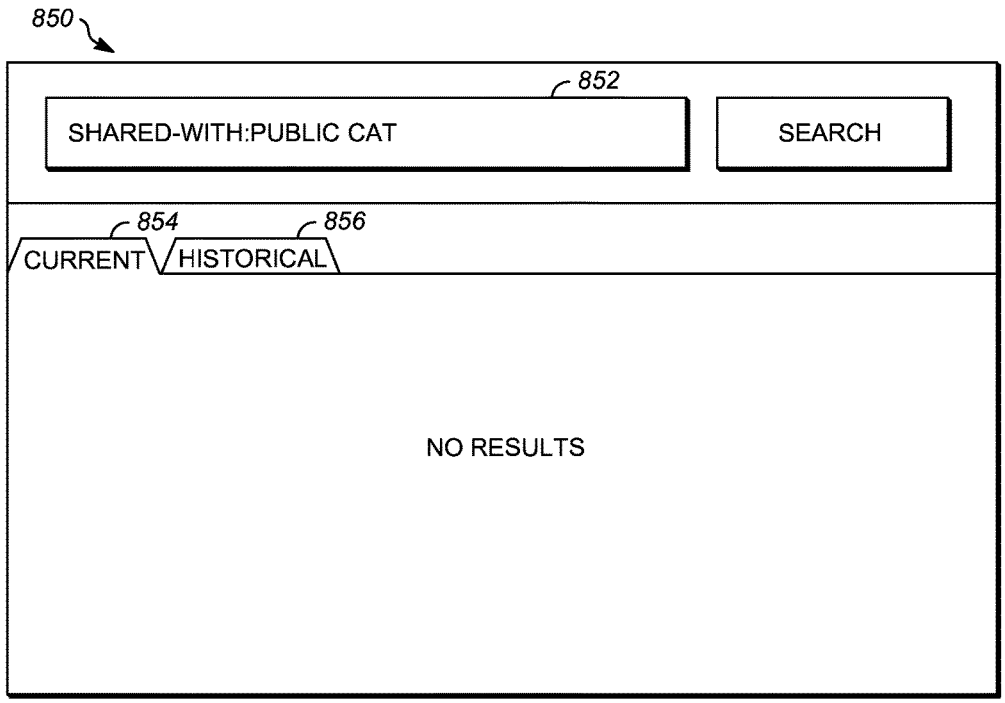
Figure 8D:
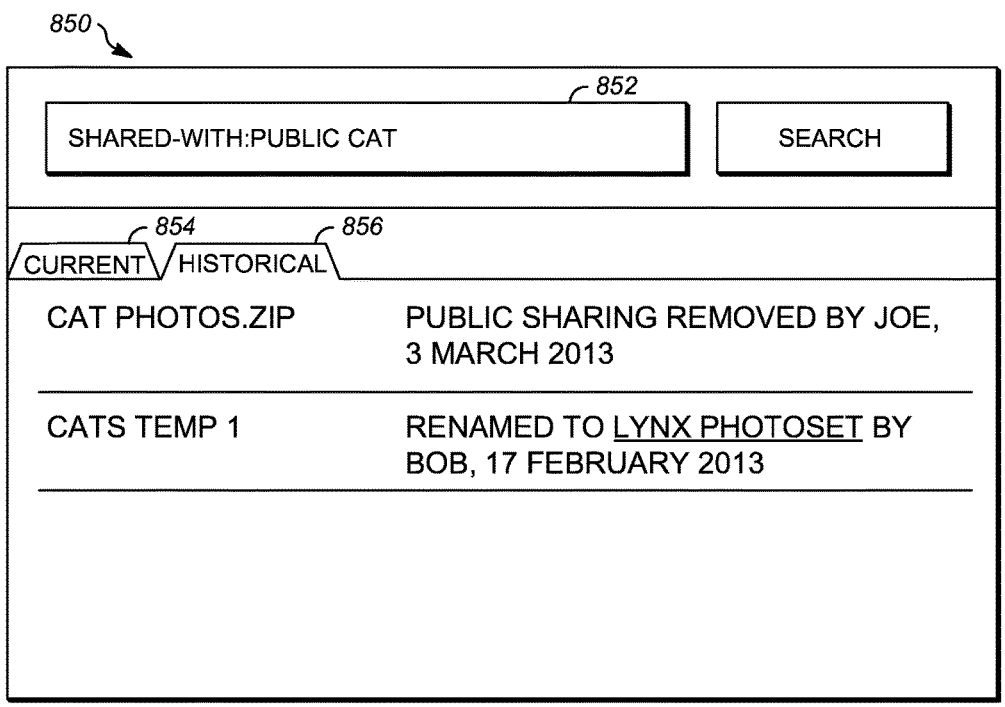

In FIG. 8C, an interface screen 850 shows a search field 852 and a tabbed results area including a current results tab 854 and a historical results tab 856. In this example, the user has entered a search input including a keyword component ("Cat") in the search field 812 as well as constraint component, which is an attribute-based search term that limits the search to objects that are shared publicly (e.g. with all users). The current results tab 854 is active, and a text legend indicates that no results were found in response to the search. Because the user believes that the file should be present, the user switches to the historical results tab 856. As shown in FIG. 8D, the historical results tab 856 includes a first result that includes information indicating that public sharing for a file named "Cat Photos.ZIP" was removed, and information indicating the identity of the user who made the change as well as information relating to the time at which the change happened. This result reflects a match based on both the object information, as the current name of the object matches "Cat", and the history information, which matches the public sharing constraint. Thus, although one or more components of the search input are not matched by the object information, the result is included because each component of the search input is matched by at least one of the object information or the history information. The historical results tab 856 includes a second result that includes information indicating that a file named "Cats Temp 1" was renamed as "Lynx Photoset", and information indicating the identity of the user who made the change as well as information relating to the time at which the change happened. As one example, this result can reflect a match based on both the object information, which matches the public sharing constraint, and the history information, as the prior name of the object matches "Cat." As another example, this result can result reflect a match based solely on history information, if it were true that the public sharing constraint was matched based on the history information but not based on the object information.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a subcombination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
   receiving, at one or more server computers from a user, a search request including a search input comprising a first input component corresponding to a portion of a name of a file and a second input component corresponding to a portion of a name of a folder where the file is stored;
   generating, by an object search component that searches object information received from a shared access service at the one or more server computers, a first search, wherein results of the first search comprise a first file having a current name that matches the first input component of the search input and is stored within a folder having a current name that matches the second input component if a first file exists;
   generating, by a history search component that searches prior-state history information received from the shared access service at the one or more server computers, a second search,
      wherein results of the second search comprise at least one of:
         a second file that has a prior name that matches the first input component of the search input, has a current name that does not match the first input component of the search input, and is stored in a folder that has a current name that matches the second input component of the search input,
         a third file that has a current name that matches the first input component of the search input, is stored in a folder that has a prior name that matches the second input component from the search input, and is stored in a folder that has a current name that does not match the second input component of the search input, or a fourth file that has a prior name that matches the first input component of the search input, has a current name that does not match the first input component of the search input, and is stored in a folder that has a prior name that matches the second input component of the search input and a current name that does not match the second input component of the search input; and outputting, for display, a current-state based search result item that identifies the results of the first search and a prior-state based search result item that identifies the results of the second search and includes information based on at least one of the current name of the second file, the current name of the folder where the third file is stored, the current name of the fourth file, or the current name of the folder where the fourth file is stored.

2. The method of claim 1, wherein the prior-state based search result item includes a link to at least one of the second file, the third file, or the fourth file.

3. The method of claim 1, further comprising:

determining whether at least one of the first file, the second file, the third file, or the fourth file is currently accessible to the user; and if at least one of the first file, the second file, the third file, or the fourth file is currently accessible to the user, including a link to the at least one of the second file, the third file, or the fourth file that is currently accessible to the user as part of the current-state based search result or the prior-state based search result.

4. The method of claim 3, wherein determining whether at least one of the second file, the third file, or the fourth file is currently accessible to the user is performed using access control information for the second file, the third file, or the fourth file, respectively.

5. A method, comprising:

receiving, at one or more server computers from a user, a search request including a search input comprising at least one input component;

generating, by an object search component that searches object information received from a shared access service at the one or more server computers, a first search, wherein result items of the first search comprise current states of objects that match the at least one input component of the search input;

generating, by a history search component that searches prior-state history information received from the shared access service at the one or more server computers, a second search, wherein result items of the second search comprise objects having a history information item that matches the at least one input component from the search input and a current state that does not match the at least one input component from the search input, wherein the history information item includes information describing a prior state of an object;

determining, at the one or more server computers, whether each object from the result items of the second search is currently accessible to the user;

if an object from the result items of the second search is currently accessible to the user, outputting, for display, a current search result item that includes a link for accessing the object; and if an object from the result items of the second search is not currently accessible to the user, outputting, for display, a historical search result item that identifies the object and includes information based on the history information item and information based on the current state of the object.

6. The method of claim 5, wherein each object from the result items of the second search is a member of at least one of a first group of objects that are currently accessible to the user or a second group of objects that are not currently accessible to the user.

7. The method of claim 6, wherein each history information item is a member of a group of history information items, wherein at least some history information items from the group of history information items describe actions taken with respect to objects from the first group of objects and at least some history information items from the group of history information items describe actions taken with respect to objects from the second group of objects.

8. The method of claim 5, wherein determining whether each object from the result items of the second search is currently accessible to the user is performed using access control information for the object.

9. The method of claim 5, wherein the information based on the history information item describes an action, the action changed a value that is associated with the object, the value corresponds to the search input, and the action caused the object to no longer be accessible to the user.

10. A method, comprising:

receiving, at one or more server computers from a user, a search request including a search input comprising input components;

generating, by a history search component that searches prior-state history information received from a shared access service at the one or more server computers, a first search, wherein results of the first search comprise historical search result items that match a first subset of the input components from the search input and are based on the prior-state history information;

generating, by an object search component that searches object information received from the shared access service at the one or more server computers, a second search, wherein results of the second search comprise current search result items that match a second subset of the input components from the search input and are based on the object information;

generating, at the one or more server computers, a filtered set of the historical search result items by excluding historical search result items that correspond to items that are represented by the current search result items; and if each input component from the input components is included in at least one of the first subset of the input components or the second subset of the input components, outputting, for display, the current search result items and the filtered set of the historical search result items, wherein each historical search result item from the filtered set of the historical search result items identifies the object and includes information based on the prior-state history information.

11. The method of claim 10, wherein the prior-state history information items describes actions taken with respect to objects that are currently stored at the one or more server computers and objects that were previously stored at the one or more server computers.

12. The method of claim 10, wherein the historical search result items and the current search result items relate to objects.

13. The method of claim 12, wherein the objects are each associated with a unique identifier, wherein excluding that historical search result items that correspond to items that are represented by the current search result items is performed using the unique identifier for each object.

14. The method of claim 10, wherein the object information describes stored objects that are currently accessible to the user.

15. A method, comprising:
    receiving, at one or more server computers from a user, a search request including a search input comprising at least one input component;
    identifying a first set of one or more objects from a plurality of objects that are stored at the one or more server computers based on a comparison of the at least one input component from the search input with history information items that describe prior states of respective objects;
    identifying a second set of one or more objects from the plurality of objects that are stored at the one or more server computers based on a comparison of the at least one input component from the search input with object information that describe current states of respective objects;
    generating a filtered first set of one or more objects by excluding objects from the first set of one or more objects that are present in both the first set of one or more objects and the second set of one or more objects; and
    outputting, for display, a search result item for each object of the filtered first set of one or more objects and each object of the second set of one or more objects, each search result item including information based on at least one of the history information items or the object information.

16. The method of claim 15, wherein only one search result item is output for display for each object.

17. The method of claim 16, wherein the search result item for each object of the second set of one or more objects excludes information based on the history information item.

18. A method, comprising:
    receiving, at one or more server computers from a user, a search request including a search input having at least one input component;
    identifying a first object based on object information that matches the at least one input component from the search input, wherein the object information describes a current state of the object;
    identifying a second object based on a history information item that matches the at least one input component from the search input, wherein a current state of the second object does not match the at least one input component from the search input, and wherein the history information item describes a prior state of the second object; and
    outputting, for display, a first search result item for the first object that includes information based on the object information and a second search result item for the second object that includes information based on at least one of the history information item or the current state of the second object.

* * * * *